United States Patent [19]

Kitai

[11] 3,709,134
[45] Jan. 9, 1973

[54] LENS SHUTTER FOR A SINGLE LENS REFLEX CAMERA

[75] Inventor: Kiyoshi Kitai, Tokyo, Japan

[73] Assignee: Kabushiki Kaisha Hattori Tokeiten, Tokyo, Japan

[22] Filed: Sept. 15, 1970

[21] Appl. No.: 72,259

[52] U.S. Cl. ..................................................95/60
[51] Int. Cl. ..............................................G03b 9/16
[58] Field of Search ...................................95/59, 60

[56] References Cited

UNITED STATES PATENTS

| | | | |
|---|---|---|---|
| 3,522,765 | 8/1970 | Johnson et al. | 95/60 |
| 3,545,352 | 8/1970 | Bellows | 95/60 X |
| 3,302,544 | 2/1967 | Kiper | 95/60 |
| 3,479,946 | 11/1969 | Bohm | 95/60 |
| 3,533,346 | 10/1970 | Erlichman | 95/60 X |

Primary Examiner—Samuel S. Matthews
Assistant Examiner—Michael L. Gellner
Attorney—Robert E. Burns and Emmanuel J. Lobato

[57] ABSTRACT

A lens shutter for a single lens reflex camera having two pivotally mounted superposed sectors operable, in timed relationship with a camera mirror, from one side of a shutter or exposure aperture sequentially in a similar sequence each first closing the exposure aperture and then opening it during travel, in a common direction, to an opposite side of the exposure aperture for taking an exposure. A delay or timing circuit is provided for controlling the exposure time by one of the sectors. The timing with the mirror is such that in effect one sector opens the shutter and the other closes it.

6 Claims, 6 Drawing Figures

LENS SHUTTER FOR A SINGLE LENS REFLEX CAMERA

This invention relates generally to lens shutters and more particularly to a shutter for a single lens reflex camera.

In the known lens shutters for single lens reflex cameras the shutter is provided with a sector mechanism in which the sector makes a reciprocating movement. The sector is actuated jointly with a mirror mechanism of the camera. The sector first opens the exposure aperture to allow focusing and is subsequently closed after which the mirror moves to an upper position so that an exposure can be taken. The shutter driving mechanism is released to again open the sector for executing the exposure on film. After a lapse of a definite time the sector is again closed and the exposure completed. The mirror then returns to a downward position so that the sector can once again open the aperture since the mirror is in the position in which focusing can be again permitted and the aperture is in effect closed by the mirror so that the film is not exposed.

A defect of these well known devices is that the sector is required to make a reciprocating motion twice in a given period of execution of an exposure which requires, therefore, a complicated sector operating mechanism. The complicated mechanism, therefore, is expensive to manufacture and sometimes will not operate properly.

A principal object of the present invention is to provide a lens shutter for a single lens reflex camera which avoids the necessity of a complicated reciprocating mechanism and is simple and inexpensive to manufacture and operates easily.

Another object is to provide a shutter that be easily controlled and coordinated with a timing or delay circuit.

In accordance with the invention the shutter is provided with only two superposed shutter sectors. The shutter sectors are disposed in a first position on one side of the shutter or exposure aperture when the shutter is cocked. The sectors are operated from the cocked position to a second position in line with the exposure aperture closing it sequentially and to a third position on an opposite side of the exposure aperture. The shutter or camera release mechanism commences the sequence of operation of the two sectors so that one sector in effect functions to open the lens or shutter exposure aperture and the other sector closes it under control of locking members and a delay circuit.

When the camera release is actuated the sector opening the exposure aperture moves to its second operative position closing the shutter aperture and during this period the reflex camera mirror mechanism moves the mirror to a raised position in which an exposure can be taken on the film once the shutter is opened. The opening sector or first sector then moves to its third operative position to initiate exposure on the film. This third position is on a side opposite the first position of the exposure aperture.

A timing or delay circuit controls the exposure time by controlling the time at which the second sector moves to its second position closing the exposure aperture so that the exposure is completed. While the second sector closes the aperture the camera mirror mechanism returns the mirror to its lowered position aligned with the exposed aperture and interrupting the light path to the film. After the mirror is lowered the second sector is released from its locked second position and moves to its third position and the shutter is again opened for allowing focusing and a next exposure to be taken.

The two shutters are then restored to their common first position by cocking of the shutter. When the camera cocking mechanism is operated one of the shutters is rotated in the opposite direction it has travelled in taking of an exposure as described above and it engages a pin on the other shutter and restores it to the first operative position so that the camera is ready to execute a next exposure.

Other features and advantages of the lens shutter in accordance with the present invention will be better understood in the following specification and dependent claims in conjunction with the following drawings in which:

FIG. 1a is a diagrammatic plan view of a shutter mechanism in accordance with the invention illustrating the shutter in a cocked condition;

FIGS. 2a–4a inclusive are diagrammatic plan views of the lens shutter in FIG. 1a illustrating operating positions of the shutter sectors;

FIG. 5a is a diagrammatic plan view of the shutter of FIG. 1a illustrating the shutter in its operating position after an exposure has been taken and the camera in an uncocked condition;

FIGS. 1b – 5b illustrate a reflecting mirror, and linkage control mechanism therefore, having elements cooperative with the shutter mechanism, wherein the stages of operation in FIGS. 1b–5b correspond respectively to stages of operation in FIGS. 1a–6a.

Figure 1:
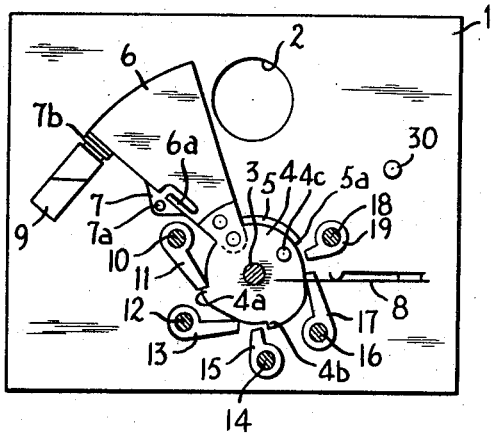

While the invention will be described as having one sector for controlling "opening" of the exposure aperture and another sector for "closing" the shutter aperture it will be understood that both sectors move from a first stationary position to a second position sequentially in which they close the exposure aperture successively and open it as hereinafter described.

In accordance with the invention, a lens shutter mechanism as illustrated in FIGS. 1a–5a, is provided with a base plate 1 provided with a shutter or exposure aperture 2. A shaft 3 pivotally mounts on the base 1 a first driving plate 4 and a second driving plate 5 which are biased in a clockwise direction by respective springs, not shown, for rotating the driving plates independently of each other. The first driving plate 4 is provided with a shutter sector 6 which operates for opening the shutter as hereinafter described. The opening shutter sector driving plate 4 is provided with profile projections or cams 4a, 4b circumferentially spaced thereon and a pin 4c effective to operate a timing switch 8 as later described. The second sector or closing sector 7 is driven independently of the opening sector by the driving plate 5 which has a profile projection or cam 5a.

The two shutter sectors are disposed in parallel planes of travel and are superposed when the shutter is in a cocked condition as illustrated in FIG. 1a. In the cocked or charged condition of the shutter the closing sector 7, operable for closing the shutter, is releasably held in a stationary first operative position by a magnetizable element comprising a piece of metal 7b on the sector which is attracted and held by an electromagnet 9 mounted on the shutter base plate 1. A release lever 11 pivotally mounted on the base plate by a pivot shaft 10 is biased in a counterclockwise direction by a spring, not shown, and engages the projection 4a on the driving plate 4 to releasably maintain or lock the plate 4 and thus maintain shutter in the cocked state or condition. A pivot 12 on the base plate rotatably mounts a first lock lever 13 which is biased in a counterclockwise direction by a spring, not shown. This lock lever or pawl engages the second peripheral projection 4b of the driving plate 4, as later described.

A pivot 14 mounted on the base plate provides a pivotal mount for a first signal lever 15 which is biased in a clockwise direction by a spring, not shown, and in the cocked condition of the shutter is not acted upon by the profile of the second projection 4b of the first driving plate 4 which functions as a camming surface for this lever. During rotation of the first driving plate 4 as hereinafter described the signal lever 15 is rotated by the camming surface described above and it transmits a command signal or movement to a mirror control mechanism, as illustrated in FIGS. 1b–5b for controlling the mirror of the reflex camera in which the shutter is mounted. This command signal initiates the rise of the mirror, as for example by rotating a pawl 15' which is coupled to the signal lever 15, from its downward imaging position to a raised position so that the exposure aperture is free of light interruption thereof by the mirror.

When the mirror reaches its upper position, the mirror mechanism rotates a pawl 13 coupled to the shutter mechanism pawl 13, so that the pawl 13 is rotated clockwise to release its engagement with the cam abutment 4b, thereby permitting further rotation of the cam 4 to its third position.

A second lock lever or pawl 17 is pivotally mounted on a shaft 16 disposed on the base plate and it too is imparted a counterclockwise rotational biasing force by a spring, not shown. This lock lever cooperates with the projection 5a of the second driving plate 5 to lock the second sector 7 in a second operative position thereof and is actuated clear of the projection to permit movement of the sector to a final or third operative position illustrated in FIG. 5a. A second signal lever 29 is pivotally supported on a pivot 18 on the base plate and has imparted thereto a clockwise rotational force by a spring, not shown, and normally is at the position illustrated in FIG. 1a when the shutter is cocked. This second signal lever is engaged by the camming projection 5a of the second driving plate 5 when the driving plate is rotationally driven so that the second signal lever 19 is rotated in a counterclockwise direction by the second driving plate. This rotation is transmitted to the mirror mechanism, to initiate the return of the mirror to its lowered position in which it is aligned with the exposure aperture 2 thereby closing it.

Figure 6:
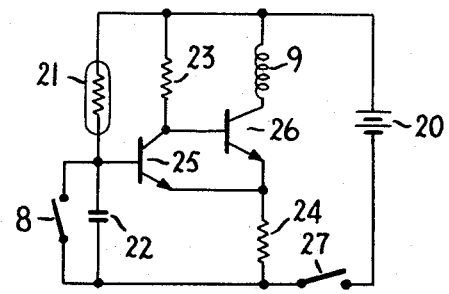
FIG. 6 is a schematic circuit diagram illustrating a timing or delay circuit used with the shutter of FIG. 1a in accordance with the invention.

The shutter is provided with control means comprising an electric timing or delay circuit illustrated in FIG. 6. As illustrated in the drawing an electrical power source 20 has connected thereto a photoelectric (CdS) cell 21 in parallel with resistors 23, 24 connected to series transistors 25, 26 to which the operating coil of the electromagnet 9 is connected. A capacitor 22 is connected in series with the photoelectric cell and the circuit is opened and closed by a power switch 27. The timing switch 8 heretofore described is connected across the capacitor 22.

The shutter is illustrated in a cocked and open condition in FIG. 1a, wherein the mirror is in a lowered position aligned with the aperture for use in focusing the camera. When the release actuator, not shown, of the camera is actuated the release lever 11 is rotated in a clockwise direction and the power switch 27 is closed by a mechanism, not shown, in the camera. In the cocked condition of the shutter the timing switch 8 is closed so that the first transistor 25 is non-conductive and the second transistor 26 is conductive. The electromagnetic operating coil 9 is excited by current flow therethrough and it attracts and holds the magnetizable metal piece 7b of its sector 7. As the release lever 11 rotates clockwise it disengages from the projection 4a of the first driving plate 4 and this driving plate and its sector 6 for opening the shutter aperture moves in a clockwise direction closing the shutter aperture 2 as illustrated in FIG. 2a. The opening sector 6 stops in this second operative position thereof by action of the first locking lever 13 engaging the second projection 4b.

Since the camming surface 4b has rotated from the position illustrated in FIG. 1 to the position illustrated in FIG. 2a it cams the first signal lever 15 and rotates it in a counterclockwise direction whereby the mirror mechanism pawl 15' of the camera is subjected to a rotational action to initiate the rasing of the mirror. When the mirror rises to a position so that it does not impede exposure on the film, the opening sector 6 having already closed the aperture so that there is no film exposure, the completion of the positioning of the mirror by the mirror movement mechanism actuates the pawl 13' to rotate the first locking lever 13 in a clockwise direction so that the first driving plate 4 is again released and its biasing spring, not shown, rotates it in a clockwise direction so that the opening sector undergoes clockwise movement and opens the shutter aperture 2 to effect exposure on the film, not shown, as illustrated in FIG. 3a.

Figure 3:
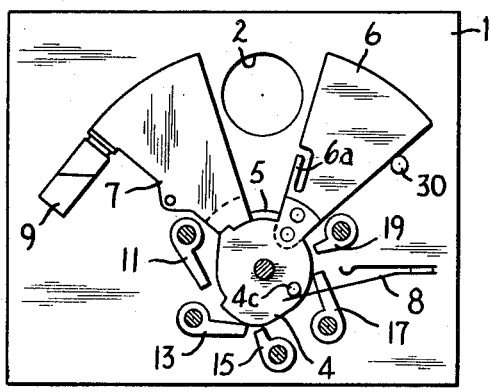

As can be seen from FIGS. 1a–3a inclusive the pin 4c of the first driving plate is disposed for engaging a blade of the timing switch 8 and opens the switch 8 as the opening sector 6 is moved from its second to its third position illustrated in FIG. 3a. As the timing switch 8 is opened the capacitor 22 is charged through the cadium sulfide photoconductive cell 21. When the charging of the capacitor 22 has progressed to exceed the point at which the transistor 25 is unblocked, this transistor 25 becomes conductive and the transistor 26 is rendered non-conductive so that current flow to the operating coil of the electromagnet 9 is interrupted and the electromagnet is demagnetized so that the operating spring, not shown, for the closing sector 7 frees the closing sector from the magnet and rotates it to its second position closing the aperture to complete the exposure on the film, not shown.

Figure 4:
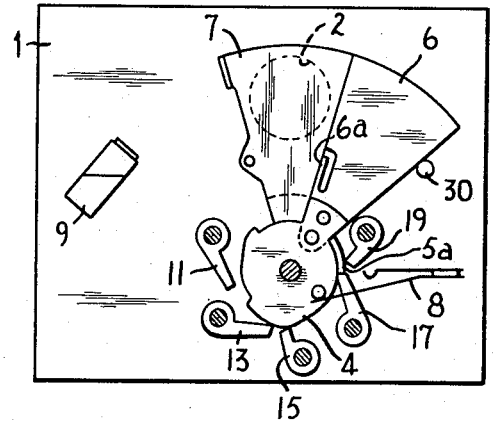
Figure 2:
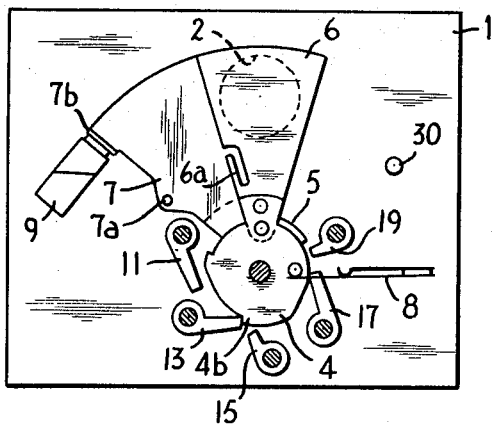
Figure 5:
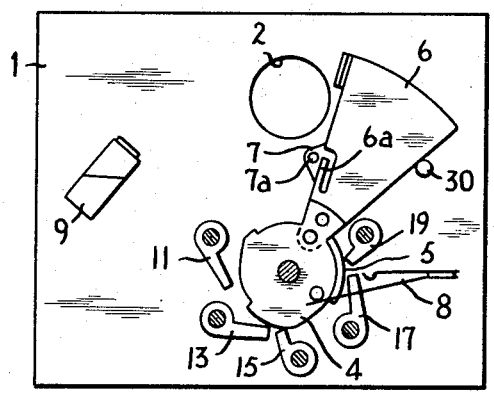

Since the second driving plate 5 has been rotated in a clockwise direction the second locking lever 17 engages the cam or projection 5a on the driving plate 5 and the closing sector 7 is releasably locked in its second operative position illustrated in FIG. 4 closing the exposure aperture.

In rotating the second driving plate cams the second signal lever 19 with its projection 5a in a counterclockwise direction to initiate from this actuation a command to a mirror control mechanism pawl 19' coupled to the signal lever 19 of the to initiate returning of the mirror from its raised position to its lowered position in which it interrupts light from the exposure aperture to the film. When the mirror reaches its lowered position a mirror mechanism pawl 17' coupled to the locking lever 17 transmits a command to that second locking lever 17 for rotating for it in a clockwise direction, and this releases the second driving plate 5 so that it is actuated in a clockwise direction, and so that the closing sector 7 is rotated clockwise to open the shutter aperture 2 and assume its third operating position illustrated in FIG. 5a in a position in which the sectors are superposed. The two sectors abut against a stop 30 and are held there against by their actuating springs, not shown.

The camera is manually cocked by known means, and the cocking mechanism, not shown, transmits a counterclockwise rotation to the first driving plate 4 in known manner. As the first driving plate 4 is rotated in counterclockwise direction the pin 7a of the sector 7 for closing engages a resilient tongue piece 6a of the first sector 6 for opening so that the second driving plate 5 and its shutter sector 7 are likewise rotated in a counterclockwise direction returning the shutter to its cocked state, illustrated in FIG. 1a with both sectors in a superposed relationship on a common side of the exposure aperture 2. As the two sectors are rotated during cocking the shutter aperture is opened again by both sectors but since the mirror is in a lowered position this does not impede operation.

The shutter, according to the invention, makes possible smooth control and operation because the shutter sectors travel successively or sequentially in one direction only during the taking of an exposure. Moreover, the shutter, according to the invention, because of its construction and structure, can be more readily combined in a reflex camera with an electronic exposure control device or circuit as against the known single lens reflex camera reciprocating sector mechanisms.

I claim:

1. A lens shutter for a single lens reflex camera comprising, two sectors only, means pivotally mounting said two sectors for movement alternately and individually each in a same sequence from a first stationary position laterally spaced from an exposure aperture for focusing the camera to a second position for closing said exposure aperture and to a third position for opening said exposure aperture, and control means for controlling the movement of said sectors alternately and individually in said sequence for sequentially closing and opening the exposure aperture with each sector and including locking means to determine the time of an exposure with one of the sectors.

2. A lens shutter for a single lens reflex camera according to claim 1, in which said means pivotally mounting the two sectors comprises means mounting the sectors in said first position on one side of said exposure aperture and on an opposite side of said aperture when said sectors are at said third position.

3. A lens shutter for a single lens reflex camera according to claim 1, in which said means pivotally mounting the two sectors comprises means operable pivotally individually in movement of said sectors from said first position to said third position, and means interconnecting the sectors for joint rotation from said third position to said first position.

4. A lens shutter for a single lens reflex camera according to claim 3, in which said means pivotally mounting the sectors mount said sectors with one sector superposed over the other sector in said first and second positions and for travel between said positions in parallel planes, and said means interconnecting the sectors comprising a pin on said one sector extending between said two planes for engagement by the other of said sectors upon movement from said third position to said first position when said shutter is cocked, and said means pivotally mounting said other shutter comprises pivoted means for cocking the shutter.

5. In a single lens reflex camera having a shutter aperture and an exposure initiating lever, an improved lens shutter device comprising first and second planar shutter sections, first and second sector-mounting means having said first and second sectors fixed respectively thereto for pivotal movement in parallel planes between respective, first, second and third sector positions, wherein both said sectors are disposed to block the shutter aperture when in their respective second positions, and are fully displaced from blocking the shutter aperture when in their respective first and third positions, and wherein said respective first and third positions for each said sector are on opposed sides of said shutter aperture, and lock means coupled to said exposure initiating lever for releasably engaging said first and second sector mounting means for controlling movement of said sectors in response to actuation of the exposure initiating lever, wherein said first sector is controlled by said lock means to move intermittently from its said first position to its said second position and then to its said third position while said second sector is held in its said first position, and subsequently said second sector is controlled to move intermittently from its said first position to its said second position and then to its said third position while said first sector is held in its said third position, and wherein a film exposure can be effected when said first sector is in its said third position and said second sector is in its said first position.

6. An improved lens shutter device as set forth in claim 5, further comprising a magnetizable element fixed to said second sector, electromagnet means disposed adjacent said first position of said second sector for attracting said magnetizable element to releasably hold said second sector in its said first position while said electromagnet means is energized, delay circuit means for energizing said electromagnet means and including a switch, and means for actuating said switch upon movement of said first sector from its said second position to its said third position, wherein said delay circuit means deenergizes said electromagnet after a predetermined time interval measured from said actuation of said switch to release said second sector for movement to its said second position.

* * * * *